(12) United States Patent
Nakajima

(10) Patent No.: US 11,691,460 B2
(45) Date of Patent: Jul. 4, 2023

(54) TYRE

(71) Applicant: Sumitomo Rubber Industries, Ltd., Kobe (JP)

(72) Inventor: Koichi Nakajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 185 days.

(21) Appl. No.: 17/103,664

(22) Filed: Nov. 24, 2020

(65) Prior Publication Data

US 2021/0178830 A1 Jun. 17, 2021

(30) Foreign Application Priority Data

Dec. 13, 2019 (JP) .............................. JP2019-225753

(51) Int. Cl.
*B60C 11/13* (2006.01)
*B60C 11/03* (2006.01)
(Continued)

(52) U.S. Cl.
CPC ...... *B60C 11/1307* (2013.01); *B60C 11/0332* (2013.01); *B60C 11/042* (2013.01);
(Continued)

(58) Field of Classification Search
CPC ............. B60C 11/1307; B60C 11/0332; B60C 11/042; B60C 11/11; B60C 2011/0374;
(Continued)

(56) References Cited

U.S. PATENT DOCUMENTS

| | | | |
|---|---|---|---|
| 7,784,508 B2 * | 8/2010 | Kemp ..................... | B60C 11/24 152/DIG. 3 |
| 2001/0032691 A1 * | 10/2001 | Ohsawa .................. | B60C 11/13 152/209.18 |
| 2017/0015142 A1 * | 1/2017 | Kaneko ............... | B60C 11/1323 |

FOREIGN PATENT DOCUMENTS

| | | |
|---|---|---|
| EP | 0 904 960 A2 | 3/1999 |
| EP | 3 118 024 A1 | 1/2017 |

(Continued)

OTHER PUBLICATIONS

Extended European Search Report for European Application No. 20208876.1, dated May 11, 2021.

*Primary Examiner* — Galen H Hauth
*Assistant Examiner* — Shibin Liang
(74) *Attorney, Agent, or Firm* — Birch, Stewart, Kolasch & Birch, LLP

(57) ABSTRACT

A tyre includes a tread portion having a tread surface being provided with a plurality of lateral grooves extending in a tyre axial direction. In a cross-sectional view perpendicular to a longitudinal direction of the at least one of the plurality of lateral grooves, the at least one of the plurality of lateral grooves includes a pair of groove walls and a groove bottom. At least one of the pair of groove walls includes a serrated portion including first surfaces and second surfaces that are arranged alternately. Each first surface is inclined outwardly in a groove width direction toward the groove bottom and has a radially inner end thereof, and each second surface extends substantially parallel with the tread surface from the radially inner end of a respective one of the first surfaces toward a groove centerline of the at least one of the plurality of lateral grooves.

14 Claims, 5 Drawing Sheets

(51) Int. Cl.
*B60C 11/04* (2006.01)
*B60C 11/11* (2006.01)
*B60C 11/12* (2006.01)

(52) U.S. Cl.
CPC ....... *B60C 11/11* (2013.01); *B60C 2011/0374* (2013.01); *B60C 2011/1213* (2013.01)

(58) Field of Classification Search
CPC . B60C 2011/1213; B60C 11/03; B60C 11/13; B60C 11/00; B60C 11/117; B60C 11/24
See application file for complete search history.

(56) References Cited

FOREIGN PATENT DOCUMENTS

| | | |
|---|---:|---|
| JP | 11-99810 A | 4/1999 |
| JP | 2000-158915 A | 6/2000 |
| JP | 2001-63319 A | 3/2001 |

\* cited by examiner

TYRE

BACKGROUND ART

Field of the Disclosure

The present disclosure relates to a tyre that is suitable as a studless tyre and that can improve braking performance on icy roads.

Description of the Related Art

In studless tyres, a tread pattern that includes a plurality of blocks defined by circumferential grooves and lateral grooves is widely adopted in order to improve driving performance on icy and snowy roads and the like.

For example, wall surfaces of lateral grooves used in such a tread pattern are generally formed by a slope inclined in a direction in which the groove width decreases toward the groove bottom (see, Patent Document 1 below).

Patent Document

[Patent document 1] Japanese Unexamined Patent Application Publication H11-99810

SUMMARY OF THE DISCLOSURE

On an icy road, the ice melts due to the ground pressure of the tyre and then a thin water film is formed on the road. When the water film exists between the tread surface and the icy road, tyre grip may sharply decrease. Thus, in order to improve braking performance on an icy road, it is important to sweep out (hereinafter, may referred to as "wiping effect") the water film on the icy road so that the water film does not enter under the tread surface.

The present disclosure has been made in view of the above circumstances and has a major object to provide a tyre capable of improving braking performance with improved wiping effect.

In one aspect of the disclosure, a tyre includes a tread portion having a tread surface being provided with a plurality of lateral grooves extending in a tyre axial direction, wherein in a cross-sectional view perpendicular to a longitudinal direction of the at least one of the plurality of lateral grooves, the at least one of the plurality of lateral grooves includes a pair of groove walls and a groove bottom, at least one of the pair of groove walls includes a serrated portion including first surfaces and second surfaces that are arranged alternately, each first surface is inclined outwardly in a groove width direction toward the groove bottom and has a radially inner end thereof, and each second surface extends substantially parallel with the tread surface from the radially inner end of a respective one of the first surfaces toward a groove centerline of the at least one of the plurality of lateral grooves.

In another aspect of the disclosure, an angle θc of each of the first surfaces may be in a range from 3 to 20 degrees with respect to a normal line of the tread surface.

In another aspect of the disclosure, the first surfaces include a radially outermost first surface and a radially innermost first surface, and the angle θc of the radially outermost first surface may be greater than the angle θc of the radially innermost first surface.

In another aspect of the disclosure, the angles θc of the first surfaces increase progressively from the radially innermost first surface to the radially outermost first surface.

In another aspect of the disclosure, the at least one of the lateral grooves may be provided with a wear indicator on the groove bottom, and the serrated portion may extend in a region from the tread surface to the wear indicator.

In another aspect of the disclosure, the tread surface may further be provided with a circumferential groove extending continuously in a tyre circumferential direction, and the at least one of the lateral grooves may be a shoulder lateral groove that extends outwardly in the tyre axial direction from the circumferential groove beyond a tread grounding edge.

As used herein, the tread surface means an outer surface in the tyre radial direction of the tread portion.

The tread grounding edges mean positions of the outermost ends in the tyre axial direction of the tread grounding surface which occurs in a standard loaded condition in the tread surface. The standard loaded condition is such that the tyre is mounted on a standard wheel rim with a standard internal pressure with a standard load.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. However, when the tyre is a passenger car tyre, the standard pressure is defined as 180 kPa.

The "standard load" is a tyre load officially approved for each tyre by standards organizations in which the tyre is based, wherein the standard tyre load is the "maximum load capacity" in JATMA, the maximum value given in the above-mentioned table in TRA, and the "Load Capacity" in ETRTO, for example.

DESCRIPTION OF THE PREFERRED EMBODIMENTS

An embodiment of the present disclosure will be explained below with reference to the accompanying drawings.

Figure 1:
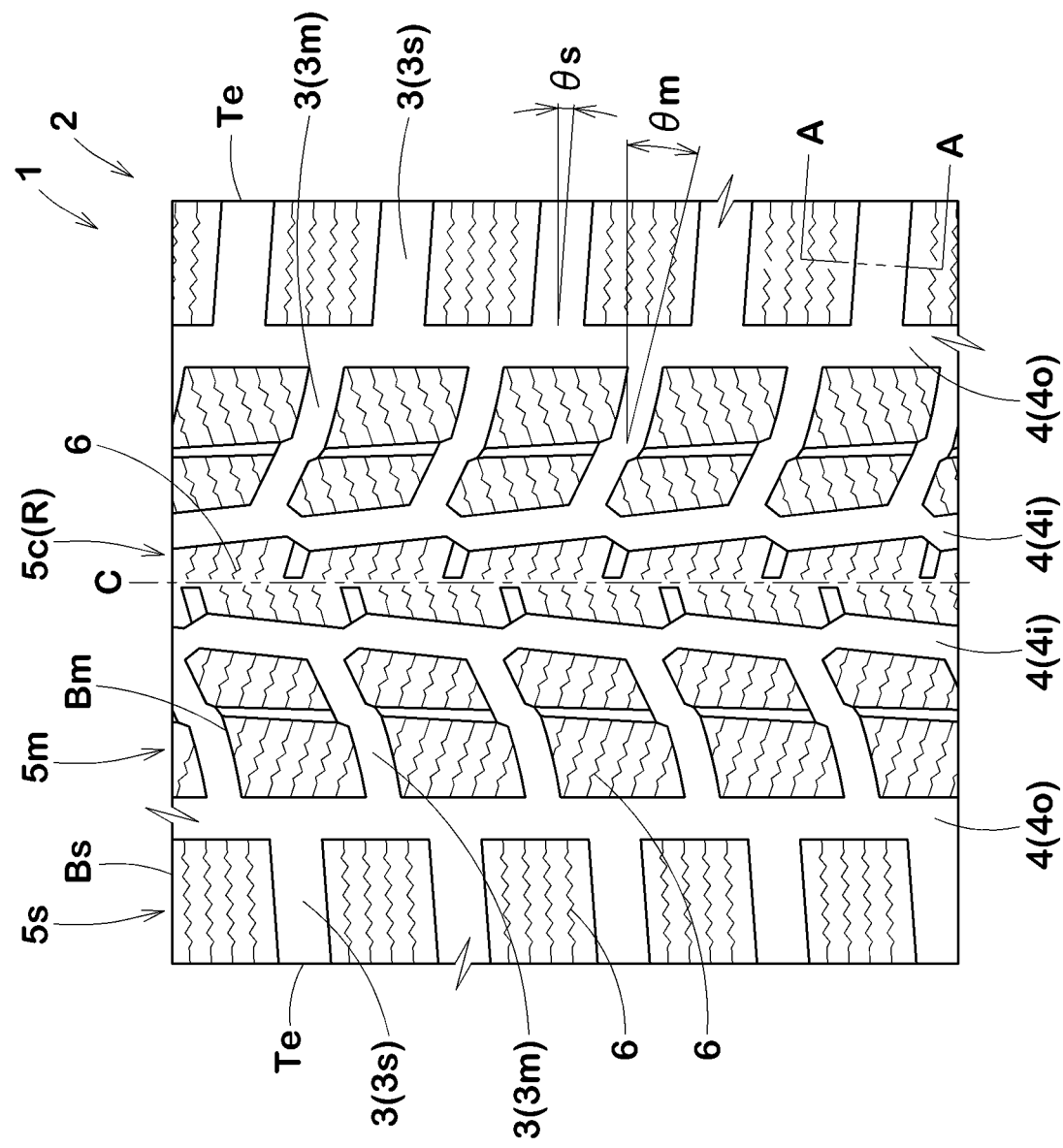
FIG. 1 is a development view of a tread pattern of a tyre according to an embodiment of the disclosure.

As illustrated in FIG. 1, the tyre 1 according to the present embodiment is a studless tyre that includes a tread portion 2 having a tread pattern provided with at least a plurality of lateral grooves 3 extending in the tyre axial direction.

Specifically, the tread pattern according to the present embodiment further includes one or more circumferential grooves 4 extending continuously in the tyre circumferential direction. The circumferential grooves 4, for example, may include four grooves that include a pair of inner circumferential grooves 4i between which the tyre equator C is disposed, and a pair of outer circumferential grooves 4o disposed outwardly in the tyre axial direction of the inner circumferential grooves 4i.

Thus, the tread portion 2 is divided into five land regions that include a center land portion 5c disposed between the circumferential grooves 4i and 4i, a pair of middle land portions 5m disposed between the circumferential grooves 4i and 4o, and a pair of shoulder land portions 5s located axially outwardly of the circumferential grooves 4o.

The lateral grooves 3, for example, include a plurality of middle lateral grooves 3m extending between the circumferential grooves 4i and 4o, and a plurality of shoulder lateral grooves 3s extending axially outwardly from the respective circumferential grooves 4o beyond the respective tread grounding edges Te.

The center land region 5c is formed into a rib R that extends continuously in the tyre circumferential direction. The middle land portions 5m each are formed into a block raw that includes a plurality of blocks Bm divided by the middle lateral grooves 3m. The shoulder land portions 5s each are formed into a block raw that includes a plurality of blocks Bs divided by the shoulder lateral grooves 3s.

Figure 4:
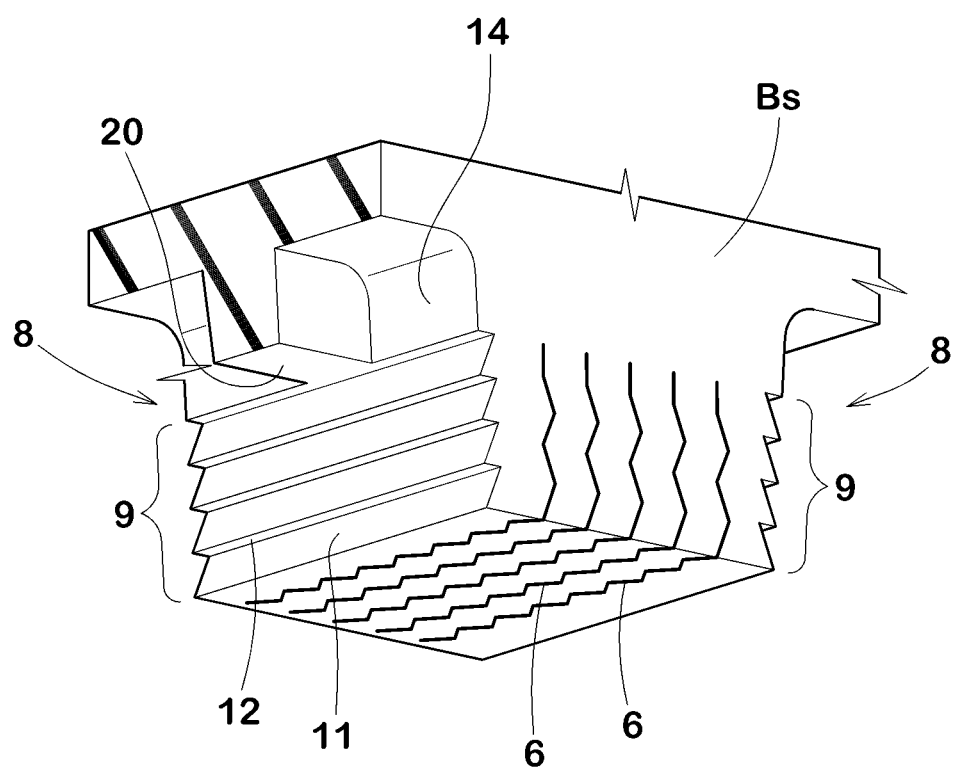
FIG. 4 is a perspective view of a block.

For the purpose of improving driving performance on snowy and icy roads, outer surfaces of the rib R, the blocks Bm and the block Bs are provided with sipes 6 which can offer edge effect. The sipes 6, for example, are narrow cuts that have a width equal to or less than 0.8 mm and that close its sipe wall surfaces when grounding. As the sipes 6, various kinds of sipes can be employed. For example, three-dimensional sipes as illustrated in FIG. 4 are preferably be employed. The three-dimensional sipes according to the present embodiment extend in a zigzag manner in the longitudinal direction on a plane parallel to the tread surface 2S, and extend in a zigzag manner in a sipe depth direction perpendicular to the tread surface 2S.

Groove widths and groove depths of the circumferential grooves 4 as well as groove widths and groove depths of the lateral grooves 3 are set as appropriate according to custom. Further, the tread pattern itself can be adopted by various patterns without any particular limitations.

Angles θm and θs of the middle lateral grooves 3m and the shoulder lateral grooves 3s, respectively, are preferably equal to or less than 30 degrees, more preferably equal to or less than 20 degrees with respect to the tyre axial direction in view of traction performance. In particular, in the shoulder lateral grooves 3s which has a large effect on steering stability, the angle θs is preferably equal to or less than 15 degrees, more preferably equal to or less than 10 degrees.

Figure 2:
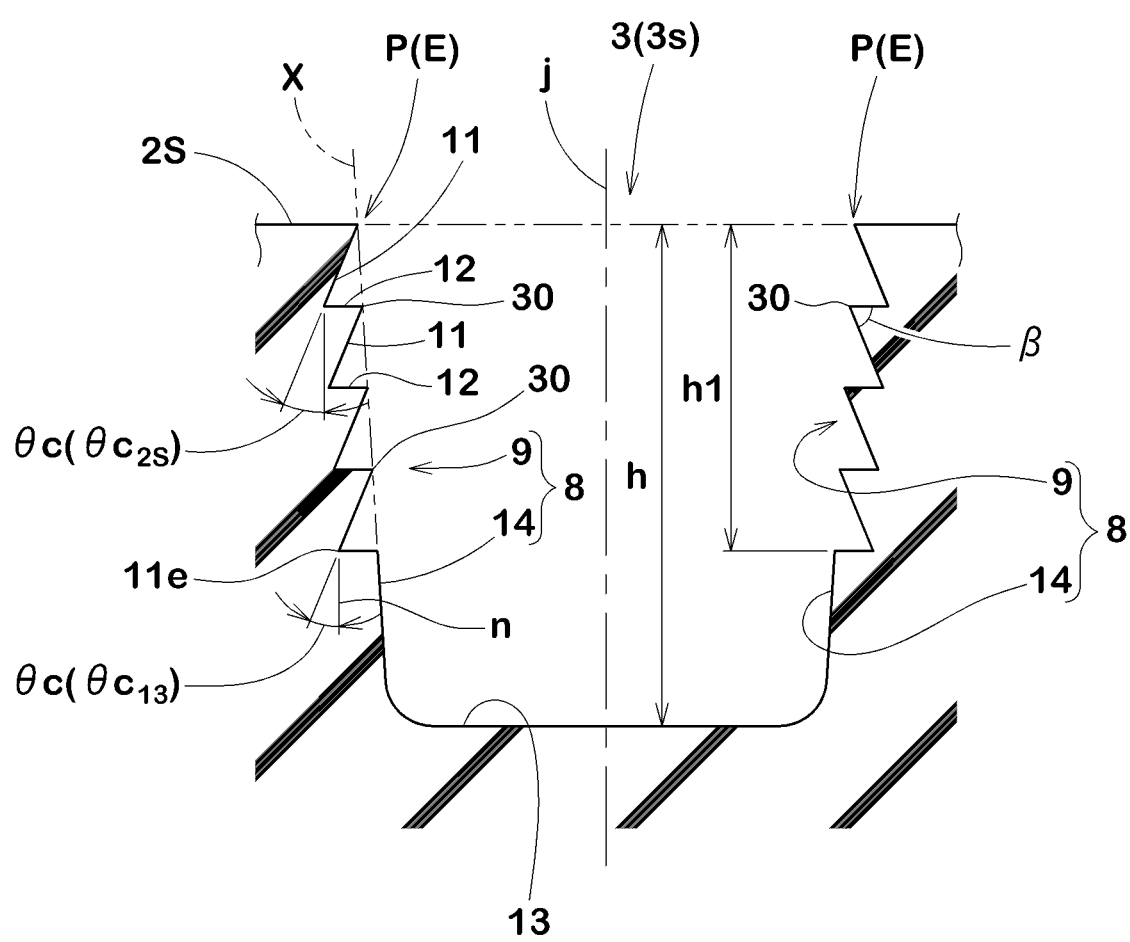
FIG. 2 is a cross-sectional view taken along line A-A of FIG. 1.

As illustrated in FIG. 2, in the present disclosure, in at least one of the lateral grooves 3, at least one of a groove walls 8 includes a serrated portion 9. FIG. 2 is a cross-sectional view taken along line A-A of FIG. 1, and is a cross sectional view perpendicular to the longitudinal direction of one of the shoulder lateral grooves 3s.

In the present embodiment, the serrated portion 9 is provided on both groove walls 8 and 8 of the shoulder lateral grooves 3s. Each serrated portion 9, in the above-mentioned cross-sectional view, includes first surfaces 11 and second surfaces 12 which are arranged alternately in a groove depth direction to form a serrated surface having a plurality of tip portions 30 between the first surfaces 11 and the second surfaces 12.

Each first surface 11 may be inclined outwardly in a groove width direction toward the groove bottom 13 and has a radially inner end 11e thereof, for example. Each second surface 12 is a surface that may extend substantially parallel with the tread surface 2S from the radially inner end 11e of a respective one of the first surfaces 11 toward the groove centerline (j) of the lateral groove, for example. Note that the "substantially parallel" shall include two cases: where (1) the second surface 12 is parallel with the tread surface 2S; and (2) the second surface 12 is inclined at an angle 5 degrees or less with respect to the tread surface 2S. Preferably, the plurality of tip portions 30 of the serrated portion 9 has an acute angle β. Further, the first surfaces are preferably longer than the second surfaces such that each of the plurality of tip portions has an acute angle β.

The serrated portion 9 extends from the tread surface 2S. The number of repetitions of the first surfaces 11 and the second surfaces 12 is not particularly regulated, but is preferably 3 to 5 times. The serrated portion 9 is preferably formed over the entire length of the groove wall 8 in the tyre axial direction.

Figure 3A:
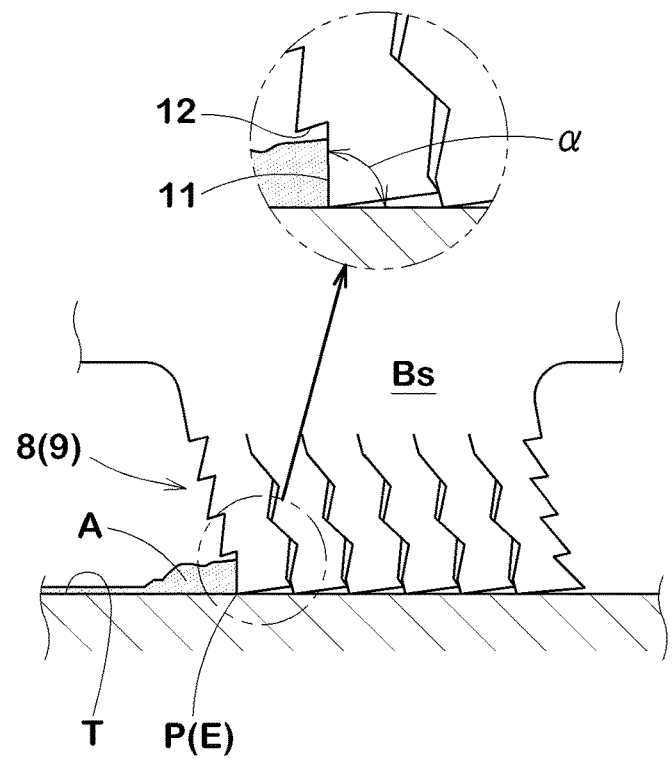
FIG. 3A is a cross-sectional view showing a ground contact state of a block with a serrated portion on a groove wall during braking.
Figure 3B:
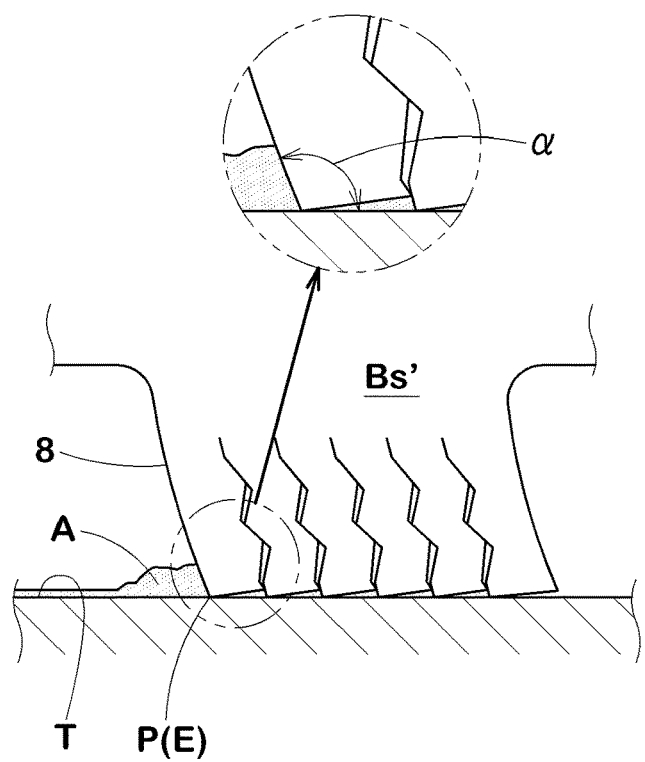
FIG. 3B is a cross-sectional view showing a ground contact state of a block without a serrated portion on a groove wall during braking.

FIG. 3A shows a ground contact state of one of the blocks Bs with the serrated portion 9 on the groove walls 8 during braking, and FIG. 3B shows a ground contact state of a block Bs' without a serrated portion on a groove wall 8 during braking.

As illustrated in FIG. 3A and FIG. 3B, upon braking, when an edge portion E where the tread surface 2S and one of the groove walls 8 intersect comes into contact with an icy road surface T, the water film (A) is swept forward in the traveling direction (wiping effect). At this time, as illustrated in FIG. 3B, in the case of block Bs' without the serrated portion 9 on the groove walls 8, since a contact angle α between one of the groove walls 8 and the icy road surface T becomes large, wiping effect thereof is insufficient, and the water film (A) tends to enter under the block.

On the other hand, as illustrated in FIG. 3A, in the case of block Bs having the serrated portion 9 on the wall surface 8, the contact angle α with the icy road surface T is small due to the first surface 11 of the serrated portion 9. Moreover, the second surfaces 12 can secure a high ground contacting pressure at the contact portion P (the edge portion E) between the groove wall 8 and the icy road surface T. Due to this synergistic effect, wiping effect of the block is enhanced so that the water film A is suppressed from entering under the block, thus improving braking performance.

Furthermore, in the serrated portion 9, the first surfaces 11 and the second surfaces 12 are alternately repeated multiple times. Thus, even if wear progresses to the tread portion 2, a new first surfaces 11 will appear of the tread surface 2S in sequence. Therefore, the above effect is exhibited for a long period of time.

Figure 5:
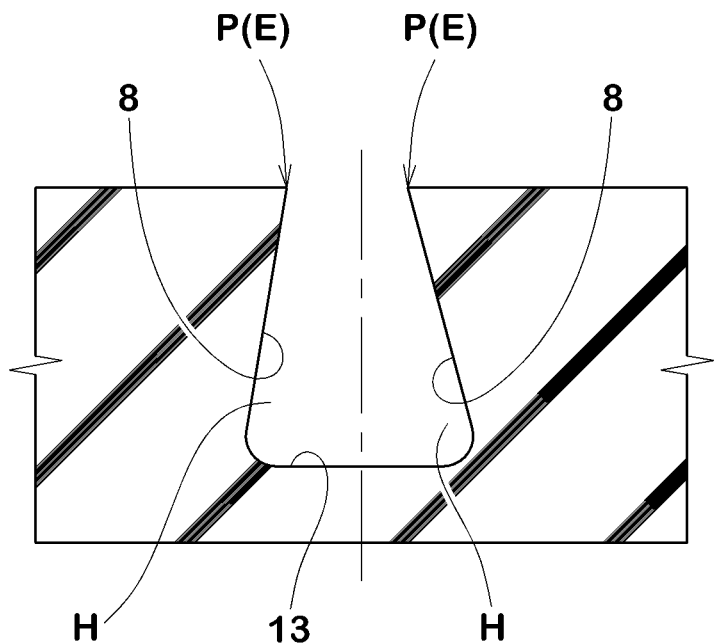
FIG. 5 is a cross-sectional view of a lateral groove according to a comparative example.

As illustrated in FIG. 5, even when the entire groove walls 8 are inclined in a direction in which the groove width widens toward the groove bottom 13, the contact angle α with the icy road surface T can be small. Unfortunately, in the case of such a groove wall structure, a void H of the lateral groove is positioned inside the edge portion E, which is the contact portion P, in the tyre radial direction. Thus, the tyre load is not sufficiently transmitted to the contact portion P, and the ground contact pressure becomes small so that the wiping effect is not sufficiently exhibited. On the other hand, in the present disclosure, since the second surfaces 12 are provided, a high ground pressure at the contact portion P can be secured.

As illustrated in FIG. 2, in an unloaded state of the tyre, an angle θc of the first surface 11 is preferably in a range from 3 to 20 degrees with respect to a normal line (n) of the tread surface 2S. When the angle θc is less than 3 degrees, the contact angle α tends to be large. Further, when the angle θc is more than 20 degrees, stiffness of the contact portion P (the edge portion E) tends to be low, resulting in lowering the ground contact pressure. Thus, wiping effect may be deteriorated. From this point of view, it is more preferable that the lower limit of the angle θc is equal to or more than 5 degrees and the upper limit is equal to or less than 10 degrees. Further, the angle θc of each of the first surfaces 11 with respect to a normal line of the tread surface 2S is preferably smaller than an angle of each of the second surfaces 12 with respect to a normal line of the tread surface.

Further, the angle $θc_{2S}$ of the radially outermost first surface 11 is preferably greater than the angle $θc_{13}$ of the radially innermost first surface 11. In particular, the angle θc of a respective one of the first surfaces is greater closer to the tread surface 2S. That is, it is preferable that the first surfaces 11 have angles θc that progressively increase from the radially innermost first surface to the radially outermost first surface.

The reason is as follows. At the initial stage of wear, since the block Bs is high, the block deformation during braking becomes large, and the contact angle α between the groove wall 8 and the icy road surface T becomes large. On the other hand, the contact angle α becomes smaller as the wear progresses. Thus, by increasing the angles θc of the first surfaces 11 on the outer side in the radial direction of the tyre, the contact angle α can be kept substantially constant without affecting the progress of wear. That is, it is possible to stably exert the wiping effect from the initial stage of wear to the final stage of wear.

From the viewpoint of ensuring a high ground pressure at the contact portion P, in the serrated portion 9, a virtual line X passing through the radial outer edges of the first surfaces 11 is preferably perpendicular to the tread surface 2S, or is preferably inclined toward the groove bottom in a direction in which the groove width decreases.

Preferably, at least one of the shoulder lateral grooves 3s is provided with a wear indicator 20 (shown in FIG. 5) on the groove bottom 13. The serrated portion 9 is preferably formed in a range from the tread surface 2S to the wear indicator 20. In a region from the serrated portion 9 to the groove bottom 13 except for a region of the wear indicator 20, a smooth surface portion 14 having a smooth surface is arranged. By providing such a smooth surface portion 14 on the groove bottom 13 side in this way, damage such as cracks that are likely to occur on the groove bottom 13 side can be prevented. The smooth surface portion 14 is preferably located on the virtual line X.

When the wear indicator 20 is not provided on the groove bottom 13, a radial distance h1 from the tread surface 2S to a radially inner end of the serrated portion 9 is in a range of 65% to 85% of a groove depth h of the shoulder lateral groove 3s.

In this embodiment, the case where the serrated portion 9 is provided on the groove walls 8 on both sides of the shoulder lateral grooves 3s is shown, but the serrated portion 9 may be formed on only one of the groove walls 8. Further, instead of the shoulder lateral grooves 3s, the serrated portion 9 may be formed on one or more groove walls 8 of the middle lateral grooves 3m. Furthermore, the serrated portion 9 may be formed on both the shoulder lateral grooves 3s and the middle lateral grooves 3m.

Although some particularly preferred embodiments of the present disclosure have been described in detail, the present disclosure may be modified to various aspects without being limited to the illustrated embodiment.

Example

Studless tyres (195/65R15) having the tread pattern shown in FIG. 1 were prototyped on the basis of the specification of the Table 1, and then braking performance on icy roads was tested when new and when 50% worn.

In Ref. 1, the groove walls of the lateral grooves are formed by slopes that are inclined in a direction in which the groove width decreases toward the respective groove bottoms. An angle of the groove walls is 10 degrees with respect to the normal line of the tread surface. In Ref. 2, the groove walls of the lateral grooves are formed by slopes that are inclined in a direction in which the groove width increases toward the respective groove bottoms. An angle of the groove walls is 7 degrees with respect to the normal line of tread surface. In the Examples, the serrated portion is formed on each groove wall of the middle lateral grooves and the shoulder lateral grooves. Further, in Example 4, the angles θc progressively increase toward the outer side in the tyre radial direction.

(1) Test for Braking Performance on Icy Roads:

Each test tyre mounted on a rim (15×6.0JJ) with an internal pressure of 230 kPa was installed to a passenger car for all wheels. Then, braking distance from a speed of 40 km/h was measured on an icy road surface at an outside temperature of −5 degrees C. The test results are indicated in Table 1 using an index where the braking distance of Ref. 1 when it is new is set to 100. The smaller the value, the better the braking performance.

TABLE 1

|  | Ref. 1 | Ref. 2 | Ex. 1 | Ex. 2 | Ex. 3 | Ex. 4 |
|---|---|---|---|---|---|---|
| Groove walls of lateral grooves | — | FIG. 5 | FIG. 2 | FIG. 2 | FIG. 2 | FIG. 2 |
| Serrated portion | none | none | presence | presence | presence | presence |
| Number of repetitions of first and second surfaces | — | — | 4 | 4 | 4 | 4 |
| Angle $θc_{2S}$ (deg.) | — | — | 3 | 7 | 10 | 10 |
| Angle $θc_{13}$ (deg.) | — | — | 3 | 7 | 10 | 3 |
| Braking performance |  |  |  |  |  |  |
| New | 100 | 103 | 98 | 97 | 95 | 95 |
| 50% wear | 98 | 100 | 96 | 94 | 92 | 92 |

As the test results, it was confirmed that the example tyres had excellent braking performance. In Example 4, it was also confirmed that uneven wear resistance and noise performance were improved in a well-balanced manner from the beginning of the wear to the end of 50%.

What is claimed is:

1. A tyre comprising:
   a tread portion having a tread surface being provided with a plurality of lateral grooves extending in a tyre axial direction, wherein
   in a cross-sectional view perpendicular to a longitudinal direction of the at least one of the plurality of lateral grooves, the at least one of the plurality of lateral grooves comprises a pair of groove walls and a groove bottom,
   at least one of the pair of groove walls comprises a serrated portion comprising first surfaces and second surfaces that are arranged alternately in a groove depth direction, each first surface extending straight,
   each first surface is inclined outwardly in a groove width direction toward the groove bottom and has a radially inner end thereof,
   each second surface extends substantially parallel with the tread surface from the radially inner end of a respective one of the first surfaces toward a groove centerline of the at least one of the plurality of lateral grooves and
   a virtual line X passing through radial outer edges of the first surfaces is perpendicular to the tread surface.

2. The tyre according to claim 1, wherein an angle θc of each of the first surfaces is in a range from 3 to 20 degrees with respect to a normal line of the tread surface.

3. The tyre according to claim 2, wherein
   the first surfaces comprise a radially outermost first surface and a radially innermost first surface, and
   the angle θc of the radially outermost first surface is greater than the angle θc of the radially innermost first surface.

4. The tyre according to claim 2, wherein the angles θc of the first surfaces increase progressively from the radially innermost first surface to the radially outermost first surface.

5. The tyre according to claim 1, wherein
   the tread surface is further provided with a circumferential groove extending continuously in a tyre circumferential direction, and
   the at least one of the lateral grooves is a shoulder lateral groove that extends outwardly in the tyre axial direction from the circumferential groove beyond a tread grounding edge.

6. The tyre according to claim 1, wherein the first surfaces of the serrated portion comprise a radially outermost first surface that extends from the tread surface, and an angle between the outermost first surface and the tread surface is an acute angle.

7. The tyre according to claim 1, wherein
   the at least one of the pair of groove walls comprises a smooth surface portion locate d between the serrated portion and the groove bottom, and
   the smooth surface portion extends on the virtual line X.

8. The tyre according to claim 1, wherein in the serrated portion, the virtual line X passing through the radial outer edges of the first surfaces is inclined toward the groove bottom in a direction in which a groove width of the at least one of the lateral grooves decreases.

9. The tyre according to claim 8, wherein
   the at least one of the pair of groove walls comprises a smooth surface portion locate d between the serrated portion and the groove bottom, and
   the smooth surface portion extends on the virtual line X.

10. The tyre according to claim 1, wherein the serrated portion extends over an entire length in the axial direction of the at least one of the lateral grooves.

11. A tyre comprising:
    a tread portion having a tread surface being provided with a plurality of lateral grooves extending in a tyre axial direction, wherein
    in a cross-sectional view perpendicular to a longitudinal direction of the at least one of the plurality of lateral grooves, the at least one of the plurality of lateral grooves comprises a pair of groove walls and a groove bottom,
    at least one of the pair of groove walls comprises a serrated portion comprising first surfaces and second surfaces that are arranged alternately in a groove depth direction to form a serrated surface having a plurality of tip portions between the first surfaces and the second surfaces,
    each first surface is inclined outwardly in a groove width direction toward the groove bottom and has a radially inner end thereof,
    each second surface extends from the radially inner end of a respective one of the first surfaces toward a groove centerline of the at least one of the plurality of lateral grooves such that each of the plurality of tip portions has an acute angle, and
    in the serrated portion, a virtual line X passing through radial outer edges of the first surfaces is perpendicular to the tread surface.

12. The tyre according to claim 11, wherein an angle θc of each of the first surfaces is in a range from 3 to 20 degrees with respect to a normal line of the tread surface.

13. The tyre according to claim 12, wherein
    the first surfaces comprise a radially outermost first surface and a radially innermost first surface, and
    the angle θc of the radially outermost first surface is greater than the angle θc of the radially innermost first surface.

14. The tyre according to claim 13, wherein the angles θc of the first surfaces increase progressively from the radially innermost first surface to the radially outermost first surface.

* * * * *